Patented Jan. 30, 1923.

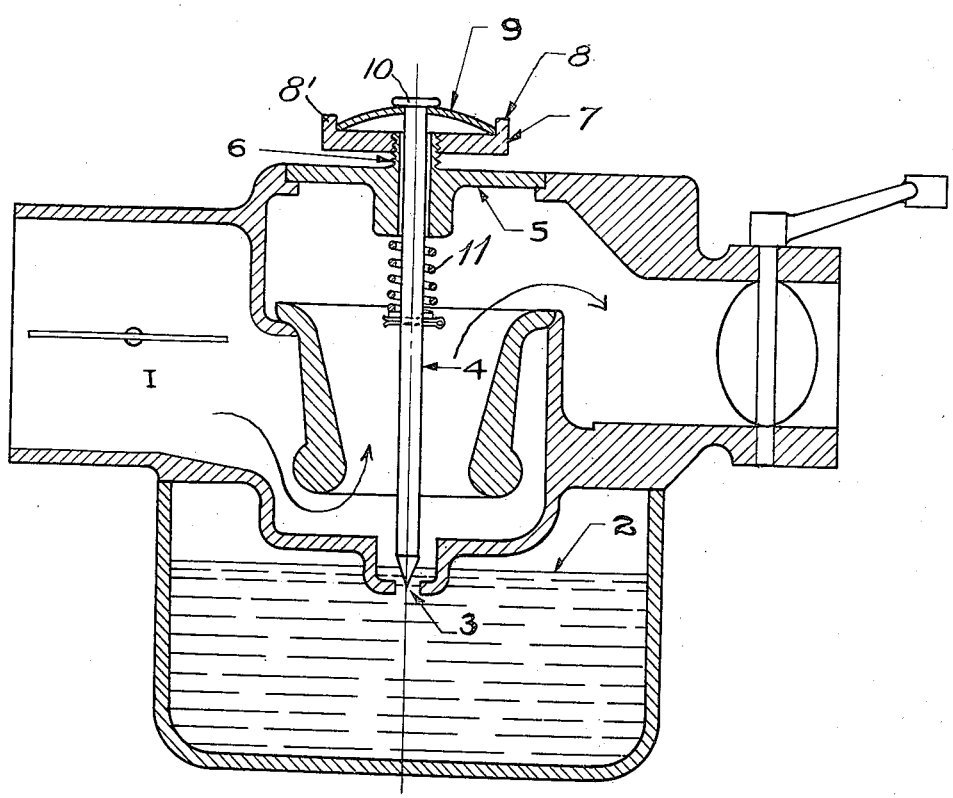

1,443,601

UNITED STATES PATENT OFFICE.

STANLEY M. UDALE, OF DETROIT, MICHIGAN, ASSIGNOR TO GEORGE M. HOLLEY, OF DETROIT, MICHIGAN.

CARBURETOR.

Application filed December 29, 1919. Serial No. 348,128.

*To all whom it may concern:*

Be it known that I, STANLEY M. UDALE, citizen of the United States, residing at Detroit, in the county of Wayne and State of Michigan, have invented certain new and useful Improvements in Carburetors, of which the following is a specification.

This invention relates to thermostatic means for controlling the flow of liquid. The specific object is to regulate the fuel supply to an internal combustion engine so that as the temperature increases the fuel supply is diminished, or rather the fuel orifice is reduced.

This thermostat is adapted for controlling thermostatically the flow of fluids in general.

The figure shows a longitudinal section of the thermostat applied to a carburetor of well known design.

In the figure, 1 is the air entrance, 2 is a constant level fuel reservoir which supplies fuel to the fuel orifice 3, which is thermostatically controlled by the needle 4. The needle 4 is carried by the cover 5 from which projects a thread 6. Around this threaded projection an aluminum piece 7 is screwed. On the piece 7 there are two projections 8 and 8'. Between these projections a steel spring 9 is inserted. The needle 4 rises on this spring 9 by means of the shoulder 10 provided thereon. A spring 11 is inserted between the cover 5, and a pin through the needle 4 keeps the shoulder 10 of the needle 4 in contact with the spring 9.

Operation: As the temperature of the air increases the piece 7 expands and allows the spring 9 to flatten out, thereby allowing the needle 4 to project further into the orifice 3 and thereby reducing the flow of fuel therethrough. The movement of the spring 9, however, is limited to the amount of deflection of the spring 9, which is determined by the length of the spring and the distance between the shoulders 8 and 8' of the aluminum piece 7. The travel of the thermostatic elements 7 and 9 is therefore limited to the amount of the initial deflection of the spring 9, which is readily adjustable by filing the projection between the shoulders 8 and 8'.

Unless the movement of the needle 4 is limited the closure of the needle 4 at high temperature is too great, the closure of the opening 3 is excessive and the resulting minimum opening is too restricted. On the other hand, in extremely cold weather the excessive opening of the needle 4 has no influence whatever as the opening 3 has necessarily a fixed maximum area beyond which any increased raising of the needle can have any effect whatever.

The expansion of the piece 8 beyond that corresponding to the free position of the spring 9, which determines the minimum opening of the orifice 3, does not bring any stress whatever on the spring 9. The result of this is that the action of the thermostat is unaffected by the repeated heating and cooling to which a thermostat is subjected in actual use.

What I claim is:

1. A needle valve, a freely expanding temperature responding element controlling the movement of said valve, means for limiting the closure of said needle valve, caused by the action of said temperature responding element while permitting the continued expansion of the temperature responding element.

2. A needle valve, a freely expanding temperature responding element controlling the movement of said valve, adjustable means for limiting the closure of said needle valve caused by the action of said temperature responding element while permitting the continued expansion of the temperature responding element.

In testimony whereof he affixes his signature.

STANLEY M. UDALE.